United States Patent [19]

Margetts

[11] 4,177,883
[45] Dec. 11, 1979

[54] DISCS FOR DISC BRAKES

[75] Inventor: Hugh G. Margetts, Leamington Spa, England

[73] Assignee: Girling Limited, Birmingham, England

[21] Appl. No.: 856,205

[22] Filed: Nov. 30, 1977

[30] Foreign Application Priority Data

Dec. 11, 1976 [GB] United Kingdom ............... 51786/76

[51] Int. Cl.$^2$ ............................................ F16D 65/12
[52] U.S. Cl. ..................... 188/218 XL; 188/264 AA
[58] Field of Search ........ 188/218 R, 218 XL, 264 A, 188/264 AA, 73.2; 192/107 R, 113 A

[56] References Cited

U.S. PATENT DOCUMENTS

| 1,890,705 | 12/1932 | Tatter | 188/218 R |
| 2,008,811 | 7/1935 | Baker et al. | 188/218 R |
| 2,375,566 | 5/1945 | Lipps | 188/218 XL |
| 3,002,595 | 10/1961 | Weir | 188/264 A |
| 3,430,741 | 3/1969 | Meredith | 188/218 XL |
| 3,486,218 | 12/1969 | Buyze | 188/218 XL |

FOREIGN PATENT DOCUMENTS

| 1214265 | 4/1966 | Fed. Rep. of Germany | 188/218 XL |
| 1961598 | 6/1971 | Fed. Rep. of Germany | 188/218 XL |
| 2110482 | 9/1972 | Fed. Rep. of Germany | 188/264 AA |
| 768603 | 8/1934 | France | 188/218 R |
| 1156941 | 5/1958 | France | 188/218 XL |
| 497708 | 9/1954 | Italy | 188/218 R |

Primary Examiner—Edward R. Kazenske
Attorney, Agent, or Firm—Scrivener, Parker, Scrivener and Clarke

[57] ABSTRACT

In a rotor for vehicle brakes, for example, discs for disc brakes and drums for shoe-drum brakes, the braking member is carried from one side of a driving component for connection to a wheel or shaft. The outer face of the member remote from the driving component comprises a braking surface which can be engaged by at least one friction member. The braking member comprises an annulus, and the driving component a cast mounting which is formed with a discontinuous abutment face with which the braking member is in direct intimate contact over a substantial area. Clamping members additional to and separate from the annulus and the mounting are provided for clamping the annulus against the abutment face to maintain the intimate contact between them.

7 Claims, 3 Drawing Figures

DISCS FOR DISC BRAKES

SPECIFIC DESCRIPTION

This invention relates to rotors for vehicle brakes, for example discs for disc brakes and drums for shoe drum brakes, the rotors being of the kind in which at least one braking member is carried from one side of a driving component for connection to a wheel or shaft and the outer face of the member remote from the driving component comprises a braking surface for engagement by at least one friction member.

In a known construction of a brake incorporating a rotor of the kind set forth the rotor comprises a disc of the ventilated type in which braking members constituted by flat rings of high carbon steel are secured to opposite faces of the driving component by welding, brazing or by the use of high temperature synthetic resin or bonding agents. In this construction the driving component comprises a spacer of corrugated outline which is blanked and formed from sheet or coil stock. Since only a small contact area is provided between the ridges of the corrugations and the rings, the "vanes" which are relatively cool will contribute little to the heat dissipation capacity of the disc. Also if the braking members are secured to the driving component at isolated local "spots" as by a plurality of screws, or by spot welding, and if the material of the spacer distorts in use the effective area of contact between the ridges and the rings may decrease.

In another known construction of a brake incorporating a rotor of the kind set forth comprising a disc with a pair of annular braking members carried from opposite sides of the driven component, the braking members are constructed of a cupro-chromium alloy which has improved properties in comparison with ordinary cast iron. In this example, the copper provises a high thermal conductivity which efficiently transfers heat generated at the braking surfaces to the bulk of the braking members and to the driving component. This has the advantage that the temperature gradients are smaller and, in consequence, the stresses arising therefrom are also smaller. In addition since copper is ductile the material of the braking surfaces can yield to absorb thermal strains without fracture. The chromium content resists the tendency of pure copper to tear and smear at the surfaces when contacted by friction members, particularly when such members are constructed from asbestos based material. Since cupro-chromium alloy is far more expensive than cast iron and is extremely difficult to cast, cupro-chromium alloy is usually utilised only in the most crit critical installations where large quantities of energy have to be dissipated in a compact assembly without face or undue wear of the friction members and without the disc cr crazing or cracking. The reason for the difficulty of casting is that the temperature range is very narrow at which both the chromium and copper in the liquid flowable form of the alloy can exist together without separating out. Any complexities in the cast shape cause local rapid cooling which leads to unacceptable discontinuity of the casting. In one known construction incorporating braking members made from cupro-chromium alloy, the driving component is of light alloy and the braking members have integrally cast tapered portions or stubs which, in turn, are embedded in the material of the driving component whilst it itself is being cast. Braking members of this form are very difficult to cast or otherwise produce due to the arrangement of the tappered portion.

According to our invention in a rotor of the kind set forth for a vehicle brake the braking member comprises an annular member, and the driving component comprises a cast mounting which is formed with a discontinuous abutment face which the braking member is in direct intimate contact over a substantial area, clamping means additional to and separate from the annular member and the mounting being provided for clamping the annular member against the abutment face to maintain an intimate contact therebetween.

The discontinuous abutment face, which may, for example, be formed by corrugations in a surface of the driving component, provides gaps for ventilation of the rotor.

Since the mounting comprises a casting, preferably of iron, it is readily constructed of sufficient thickness to provide adequate stiffness with the discontinuous abutment necessary to construct a rotor of the ventilated type, so that the discontinuous face will not distort under heavy clamp forces, and casting is simple to accomplish by the use of a two-part mould.

The annular member is preferably of a material having a high thermal conductivity. For example, the material may be a cupro-chromium alloy.

When the rotor comprises a disc for a disc brake in which braking members are carried from opposite faces of the driving component, both braking members comprise flat rings, and the cast mounting is formed on opposite sides with flat parallel discontinuous abutment faces into intimate contact with which the rings are clamped over substantial areas by the clamping means.

Constructing the braking members from flat rings facilitates constructing since the rings can be blanked and/or machined from rolled strip, or simple castings or forgings; providing the abutment faces of substantial area ensures effective heat dissipation and transfer away from the braking surfaces in service, with the abutment faces being produced by a simple machining operation; and incorporating clamping means additional to and separate from the rings and the mounting permits relative movement between the three components to compensate for the different thermal co-efficients of expansion of the two materials, and the difference in temperature between them in operation.

The mounting may comprise a radial flange of corrugated outline comprising angularly spaced radial ribs which are interconnected by integral radial vanes and the outer faces of the ribs on opposite sides of the flange comprise the discontinuous abutment faces which represent at least 50% of the total area of the rings with which they are clamped into engagement.

Figure 1:
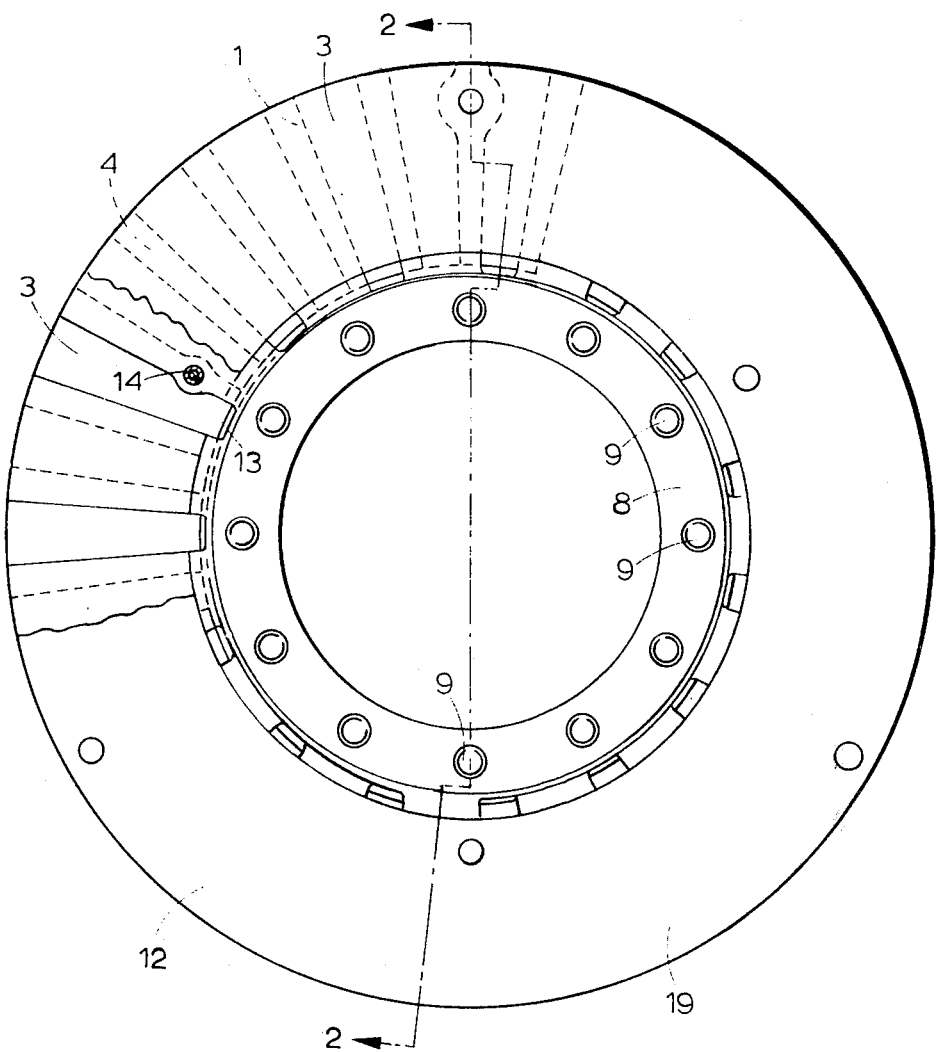
FIG. 1 is an elevation of a disc for a disc brake of a vehicle with a portion of one braking member omitted for clarity.
Figure 2:
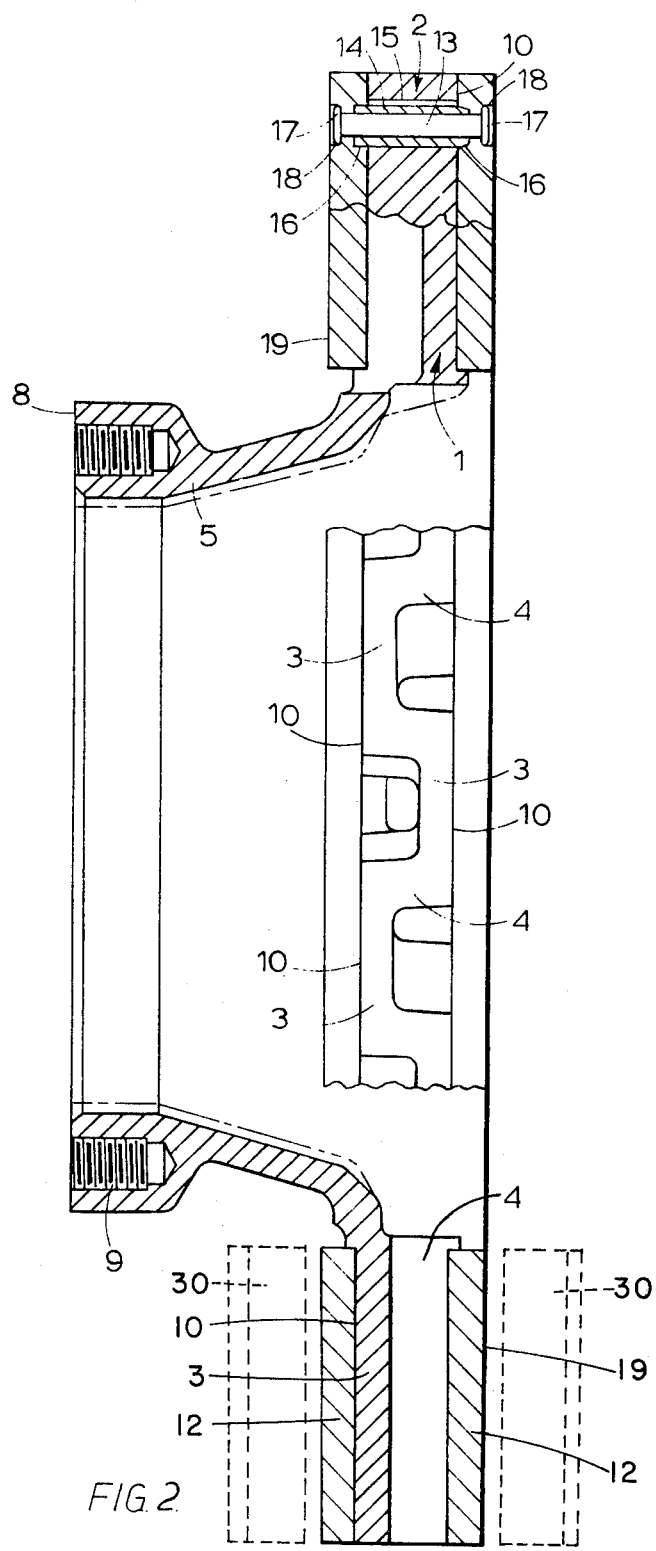
FIG. 2 is a section on the line 2—2 of FIG. 1.

The disc illustrated in FIGS. 1 and 2 of the drawings comprises a driving component 1 in the form of an iron casting defining a radial flange 2 of corrugated outline which has angularly spaced radial ribs 3 of which adjacent pairs are interconnected at adjacent ends by angularly spaced radial vanes 4. The inner peripheral edge of the flange 2 may be cast integrally with a generally axially extending hub portion 5 of which the free end terminates in a radial clamp face 8 provided with angularly spaced tapped holes 9 by means of which the driving component can be connected to a rotatable part. The outer faces 10 of the ribs are flat and are aligned in two spaced parallel planes to define discontinuous annular abutment faces.

A pair of annular braking members comprising parallel sided flat continuous rings 12 of a cupro-chromium alloy abut against the abutment faces of the flange 2. The rings 12 are clamped against the abutment faces by angularly spaced rivets 13 which project through angularly spaced superimposed openings in the rings and in roll pins 14 which project through openings 15 in the flange 2 and are located at opposite ends in counterbored recess 16 in the rings. Heads 17 at opposite ends of the shanks of the rivets 13 are received within counterbored recesses 18 in the outer faces of the rings 12. The roll pins 14 are slightly shorter than the thickness of the flange 2 plus the depth of the counterbored recesses 16 so that the clamping force from the rivets 13 applied to the rings 12 urges the rings into engagement with the abutment faces which are equal in area to at least 50% of the area of the rings.

In operation in a brake, the outer faces 19 of the rings are parallel and comprise braking surfaces for engagement by friction members 30. Circumferential braking forces are transmitted through the roll pins 14 although a large proportion of such forces will be taken by the friction grip between the rings 12 and abutment faces.

The fixing comprising the roll pin 14 and the rivets 13 is such as to allow the requisite radial movement or slippage between the braking members and the driving component due to thermal strains without damaging any of the components.

Figure 3:
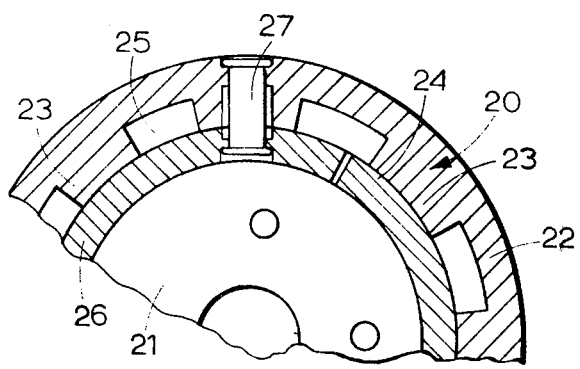
FIG. 3 is a transverse section through a drum for a brake of the internal shoe-drum type.

The drum illustrated in FIG. 3 comprises a driving component 20 comprising a plate 21 carrying from its outer peripheral edge an axially extending radial flange 22 of cast iron which may be cast integrally with the plate 21. The flange 22 is formed with plurality of angularly spaced, inwardly directed radial vanes 23, which extend axially for the length of the flange 22. The inner faces of the vanes 23 define a discontinuous circular abutment face 24, and channels 25 between adjacent vanes may be open at both axial ends.

A braking member 26 of cupro-chromium alloy in the form of a cylindrical sleeve is received within the flange 22 and abuts against the abutment face 25 which is equal in area to at least 50% of the cylindrical surface area of one side of the sleeve 26. The sleeve 26 is clamped against the abutment face by means of a plurality of angularly spaced radial rivets 27 which project through superinposed radial openings in the vanes 23 and the sleeve 26 and of which the heads are received in counterbored recesses in the outer ends of the respective openings.

The sleeve 26, of which the inner face is adapted to be engaged by brake shoes, may be constructed from a rolled strip, bent into a circle which is not necessarily completed.

I claim:

1. A disc for a disc brake comprising a driving component for connection to a rotatable member to be braked, said driving component comprising a cast mounting having flat opposite discontinuous abutment faces, annular braking members carried from said abutment faces, each of said braking members comprising a flat ring having a first face for direct intimate contact over a substantial area with a respective one of said abutment faces and a second opposite face for engagement by at least one friction member, and angularly spaced rivets additional to and separate from said annular members and said mounting for clamping said annular members against said abutment faces to maintain said direct intimate contact therebetween, wherein said angularly spaced rivets are circular in section and have heads, recessed openings are provided in said second faces of said annular members for receiving said heads, and openings are provided in portions of said driving component through which said rivets project, and wherein roll pins pass through said openings in said driving component and have opposite ends which are received in recesses in said first faces of said annular members, said roll pins having plain cylindrical bores through which said rivets project.

2. A disc as claimed in claim 1, wherein said discontinuous abutment face is formed by corrugations on a surface of said driving component.

3. A disc as claimed in claim 1, wherein said braking members are constructed of a material having a high thermal conductivity.

4. A disc as claimed in claim 3, wherein said material is a cupro-chromium alloy.

5. A disc as claimed in claim 1, wherein said mounting comprises a radial flange of corrugated outline, said flange comprising angularly spaced radial ribs and integral radial vanes for connecting said ribs, outer faces of said ribs on opposite sides of said flange comprising said discontinuous abutment faces which represent at least 50% of total area of said rings with which said abutment faces are clamped into engagement.

6. A disc as claimed in claim 5, wherein said openings are provided in portions of corresponding vanes in said driving component.

7. A disc as claimed in claim 1, wherein said roll pins are adapted to transmit solely the circumferential forces due to braking.

* * * * *